United States Patent
Eldridge

(10) Patent No.: US 7,911,634 B2
(45) Date of Patent: Mar. 22, 2011

(54) METHOD AND SYSTEM FOR MAINTAINING DEVICE SPECIFIC IMAGE CORRECTIONS FOR PRINTERS UTILIZING REMOTE RASTER IMAGE PROCESSING

(75) Inventor: George L. Eldridge, Long Beach, CA (US)

(73) Assignee: Xerox Corporation, Norwalk, CT (US)

( * ) Notice: Subject to any disclaimer, the term of this patent is extended or adjusted under 35 U.S.C. 154(b) by 994 days.

(21) Appl. No.: 11/191,077

(22) Filed: Jul. 28, 2005

(65) Prior Publication Data
US 2007/0024889 A1  Feb. 1, 2007

(51) Int. Cl.
*G06F 3/12* (2006.01)
*G06K 15/00* (2006.01)
*H04N 1/46* (2006.01)
*G03F 3/08* (2006.01)

(52) U.S. Cl. ...... 358/1.15; 358/1.16; 358/504; 358/515; 358/518; 358/524

(58) Field of Classification Search ........ 358/1.11–1.18, 358/1.8, 1.9, 500, 504, 515, 518, 524
See application file for complete search history.

(56) References Cited

U.S. PATENT DOCUMENTS

| | | | |
|---|---|---|---|
| 6,384,895 B1 * | 5/2002 | Sawano | 355/40 |
| 6,606,165 B1 * | 8/2003 | Barry et al. | 358/1.9 |
| 7,092,119 B1 * | 8/2006 | Hinds et al. | 358/1.9 |
| 2003/0011805 A1 * | 1/2003 | Yacoub | 358/1.15 |
| 2003/0117648 A1 * | 6/2003 | Akiyama et al. | 358/1.15 |
| 2006/0152764 A1 * | 7/2006 | Loce et al. | 358/3.06 |

FOREIGN PATENT DOCUMENTS

JP   09073375 A  *  3/1997

* cited by examiner

*Primary Examiner* — James A Thompson
(74) *Attorney, Agent, or Firm* — MH2 Technology Law Group LLP

(57) ABSTRACT

An embodiment of the invention generally relates to a method for providing printing services. A database is configured to store data related to a plurality of print engines. The data includes static and time-varying characteristics for each of the print engines of the plurality of print engines. A first print engine is selected from the plurality of print engines. A print job is initiated for the first print engine. The print job is processed at a remote printing service based on data related to the first print engine to create a first print engine print file. The first print engine file is provided to the first print engine.

10 Claims, 3 Drawing Sheets

METHOD AND SYSTEM FOR MAINTAINING DEVICE SPECIFIC IMAGE CORRECTIONS FOR PRINTERS UTILIZING REMOTE RASTER IMAGE PROCESSING

FIELD

This invention generally relates to printing. More particularly, the invention relates to a method and system for maintaining device specific image corrections for printers utilizing remote raster image processing.

DESCRIPTION OF THE RELATED ART

A digital rendering system renders a digital image, consisting of electronic pixel data, to a human readable version of the image. Digital rendering systems typically include: 1) an input section, sometimes referred to as an image input terminal ("IIT") or a digital front end ("DFE"); 2) a controller, sometimes referred to as an electronic subsystem ("ESS") or an image processing system ("IPS"), and 3) an output section, sometimes referred to as an image output terminal ("IOT").

The input section either generates or translates one form of image data to digital image data that can be provided to the controller. The input section can be a scanner, individual computer, distributed computer network, electronic storage device, or any device capable of generating or storing the digital image. The controller processes the digital image data to create machine readable image data that is compatible with the output section. The controller also controls operations within the output section. The output section receives machine readable image data from the controller and produces a human readable version of the digital image. The output section can be a display device (e.g., cathode ray tube ("CRT") monitor), marking platform (e.g., copier or printer), electronic storage device, or any device capable of producing a human readable image.

For marking platforms, the output section is sometimes referred to as a print or marking engine. Again in reference to marking platforms, the human readable image is created by depositing marking material on a print page. The print page is often a single sheet of white paper; however, numerous other materials are available. Two technologies commonly used in marking platforms are ink marking and toner marking. Ink-jet printers and offset printing presses are common examples of platforms that implement ink marking technology. Marking platforms that use toner marking include xerographic print engine, a thermal inkjet device, an acoustic ink print engine, piezo-electric print engine, electrophotographic printers, copiers, multifunction peripherals and etc.

The typical digital rendering system may be expensive. One potential way to reduce the cost of the digital rendering system may be to move the function of the DFE to a remote service. The remote service could combine document creation operations with raster image processing ("RIP") operations. This remote service would allow users to purchase the amount of processing power they need to prepare their documents.

However, the solution of providing RIP services in a remote service has its drawbacks and disadvantages. For example, remote services typically do not take into account for the difficulty in correcting for device specific characteristics. Remote services typically have fully equipped marking platforms, i.e., printers. More specifically, printers exhibit fixed (or static) and time-varying (or dynamic) characteristics. For example, a static characteristic for a marking platform may be toner colorant and a dynamic characteristic may be tone reproduction curve ("TRC"). The TRC modifies the raster data before it is sent to the printing device. A TRC is an electronic map (a graphic representation of the relationship of input v. output) that converts an input image value to a desired image out value. Current color xerographic printers use calibration along with hardware to implement the TRC to maintain linear color responses. However, to reduce the cost of digital rendering systems, the printers would have TRC hardware eliminated, i.e., reduced-cost printers. As a result, the potential output of the remote services with the reduced-cost printers output may not be as optimal as the full-equipped printers.

SUMMARY

One embodiment pertains to a method for providing printing services. The method includes providing a database configured to store data related to a plurality of print engines, where the data includes static and time-varying characteristics for each of the print engines of the plurality of print engines. The method also includes selecting a first print engine from the plurality of print engines and initiating a print job for the first print engine. The method further includes processing the print job at a remote printing service based on data related to the first print engine to create a first print engine print file and providing the first print engine file to the first print engine.

Another embodiment relates to a system for providing printing services. The system includes a plurality of print engines, a remote printing service, and a network configured to connect the plurality of print engines and the remote printing service. The remote printing service further includes a plurality of document applications, a print engine database configured to store data associated with static and time-varying characteristics of each of the print engines of the plurality of print engines, and a digital front end. The remote printing service is configured such that the print job issued for a selected print engine from the plurality of print engines from a selected document application is processed with data associated with the selected print engine by the digital front end to generate a print file.

Yet another embodiment pertains to a computer readable storage medium on which is embedded one or more computer programs. The one or more computer programs implement a method of providing printing services. The one or more computer programs includes a set of instructions for providing a database configured to store data related to a plurality of print engines, where the data includes static and time-varying characteristics for each of the print engines of the plurality of print engines. The set of instructions also include selecting a first print engine from the plurality of print engines and initiating a print job for the first print engine. The set of instructions further include processing the print job at a remote printing service based on data related to the first print engine to create a first print engine print file and providing the first print engine file to the first print engine.

BRIEF DESCRIPTION OF THE DRAWINGS

Various features of the embodiments can be more fully appreciated as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of printing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to a remote printing service ("RPS") system that reduces the overall cost of printing. More particularly, the RPS system includes a RPS, and reduced electronics print engines. The reduced electronics print engines are printers with the minimum hardware to print a print job onto a hard copy medium. The reduced electronics print engines cannot perform, for example, any raster image processing or digital front end processing. Instead, the RPS may be configured to provide document creation services as well as the digital front end processing and raster image processing operations of print jobs. The RPS may then forward the print files to the reduced electronics print engines for printing onto a hard copy medium, e.g., paper.

Figure 1:
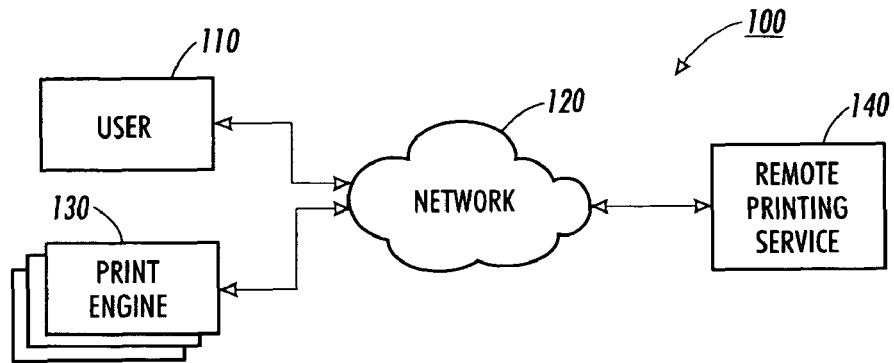
FIG. 1 illustrates an exemplary block diagram of a system in accordance with an embodiment of the invention.

FIG. 1 illustrates a block diagram of a system 100 in accordance with an embodiment. It should be readily apparent to those of ordinary skill in the art that the system 100 depicted in FIG. 1 represents a generalized schematic illustration and that other components may be added or existing components may be removed or modified.

As shown in FIG. 1, the system 100 includes users 110, a network 120, print engines 130, and a remote printing service 140. The users 110 may be a plurality of computing platforms where users may access the print engines 130 and remote printing service 140. The computing platforms may be implemented with personal computers, laptop computers, handheld devices, personal digital assistant, workstations, or other similar devices.

Users 110 may be configured to interface with the network 120. The network 120 may be configured to provide a communication channel between the users 110, print engines 130 and the remote printing service 140. The network 120 may be implemented as a local area network (wired or wireless), wide area network or a combination thereof. The network 120 may also be implemented with network protocols such as Ethernet, token ring, ATM, or some combination thereof.

The print engines 130 may be marking platforms. The print engines 130 may be implemented with xerographic print engines, thermal inkjet devices, acoustic ink print engines, piezo-electric print engines, electrophotographic printers, copiers, multifunction peripherals, or some combination thereo However, print engines 130 are reduced cost printers that do not include any toner reproduction curve hardware or any hardware that performs any image processing. The reduced cost printers have only a network interface and electronics to cause the received digital image to be printed. The reduced cost printers do not have the ability to perform any image processing on the received digital image.

The remote printing service ("RPS") 140 may be configured to provide document creation services as well as raster image processing for the users 110. The RPS 140 may also include a database of static and dynamic characteristics as well as other image correction data of the print engines 130. As a result, when a user issues a print command for a selected printer of the print engines 130, the RPS 140 may be configured to access the database to apply the image correction data for that selected printer. The RPS 140 may use the image corrections and other characteristics to generate a print ready format that has all the necessary corrections includes. The RPS 140 may then transmit the print ready format file over the network 120 to the selected print engine 130 where it will produce the desired output.

Figure 2:
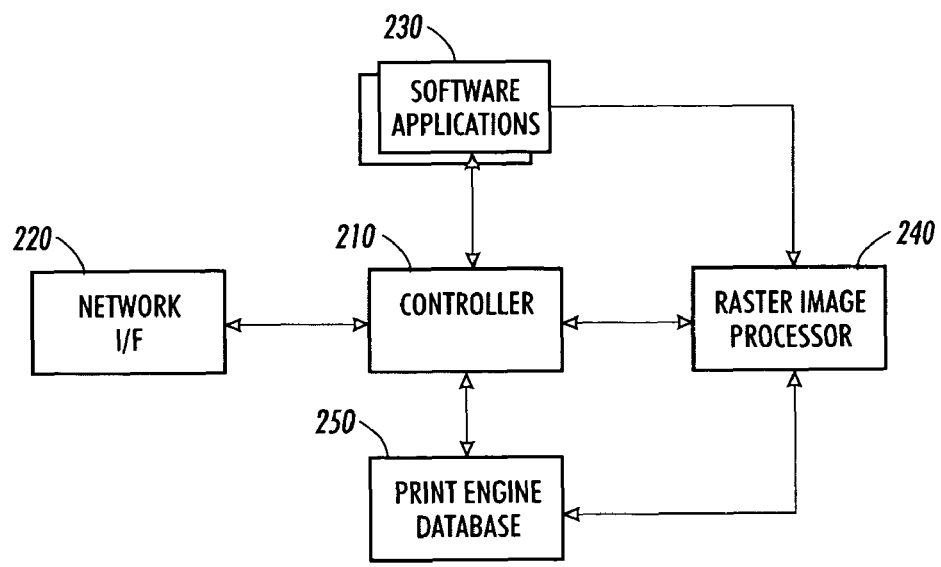
FIG. 2 illustrates an exemplary architecture diagram of the remote printing service in accordance with another embodiment of the invention.

FIG. 2 illustrates a block diagram of the RPS 140 shown in FIG. 1 in accordance with an embodiment. It should be readily apparent to those of ordinary skill in the art that the RPS 140 depicted in FIG. 2 represents a generalized schematic illustration and that other components may be added or existing components may be removed or modified.

As shown in FIG. 2, the RPS 140 includes a controller 210, a network interface ("I/F") 220, a raster image processor 240, and a print engine database 250. The controller 210 may be configured to provide for the management of the functionality of the RPS 140. The controller 210 may be implemented with a microprocessor, a digital signal processor, an application specific integrated circuit or some combination thereof. Alternatively in some embodiments, the functionality of the controller 210 may also be implemented in software.

The controller 210 may be configured to interface with the network I/F 220. The network I/F 220 may be configured to provide a communication interface with the network 120 (shown in FIG. 1). The network I/F 220 may be implemented with a network interface card.

The controller 210 may also be configured to interface with software applications 230. The software applications 230 may be word processing applications (e.g., Word™, Wordperfect™, etc.), spreadsheet applications (e.g., Excel, Lotus, etc), presentation applications, database applications, etc. The controller 210 may be configured to allow users access the software application 230.

The controller 210 may be further configured to interface with the raster image processor 240. The raster image processor 240 may be configured to use the image corrections and other characteristics stored in the print engine database 250 to generate a print ready format to transmit to print engine 130. The raster image processor 240 may also be configured to convert the vector image data from the software applications 230 to the bit-imaged data for the print engine 130.

The controller 210 may be further configured to print engine database 250. The print engine database 250 may be configured to store image correction data which may include dynamic and static characteristics of the print engines 130. In some embodiments, the print engine database 250 may be directly interfaced with the raster image processor 240.

In some embodiments, the print image database 250 may be updated by the controller 210. More specifically, the controller 210 may periodically issue printer calibration tests on the print engines 130. As the calibration tests are completed, the controller 210 may retrieve the calibration test data which may include static and dynamic characteristics (e.g., toner reproduction curve ("TRC")) from the selected print engine 130. Other static characteristics include halftone screen selection and printer resolution. Other dynamic characteristics include gray balance on color printers. In other embodiments, the print engines 130 may be configured to transmit the image correction data in response to user initiated printer calibration test.

Figure 3:
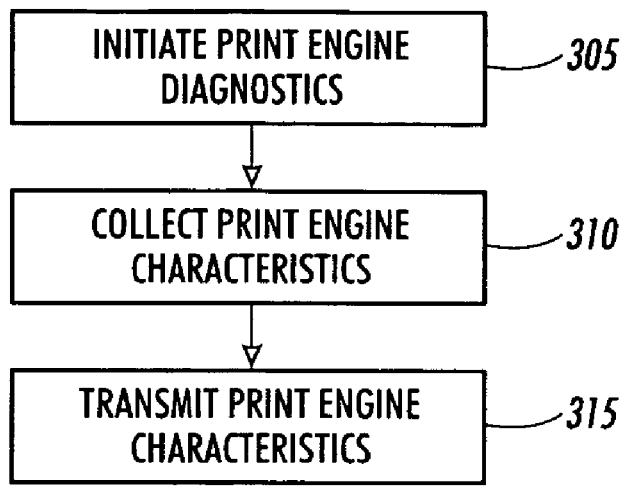
FIG. 3 illustrates a flow diagram implemented by the remote printing service in accordance with yet another embodiment of the invention.

FIG. 3 illustrates a flow diagram 300 implemented by the controller 210 in accordance with yet another embodiment. It should be readily apparent to those of ordinary skill in the art that the flow diagram 300 depicted in FIG. 3 represents a generalized illustration and that other steps may be added or existing steps may be removed or modified.

As shown in FIG. 3, the controller 210 may be configured to initiate a print engine diagnostic test, in step 305. More particularly, the controller 210 may be configured to periodically initiate printer calibration tests on print engines 130 that may be accessed by the users 110.

In step 310, as the print calibration test completes, the selected print engine 130 may be configured to collect the image correction data e.g., static and dynamic characteristics in a file.

In step 315, the selected print engine 130 may be configured to transmit the image correction data to the RPS 140. More particularly, the controller 210 may be configured to receive the image correction data and then forward that data to the print engine database 250.

Figure 4:
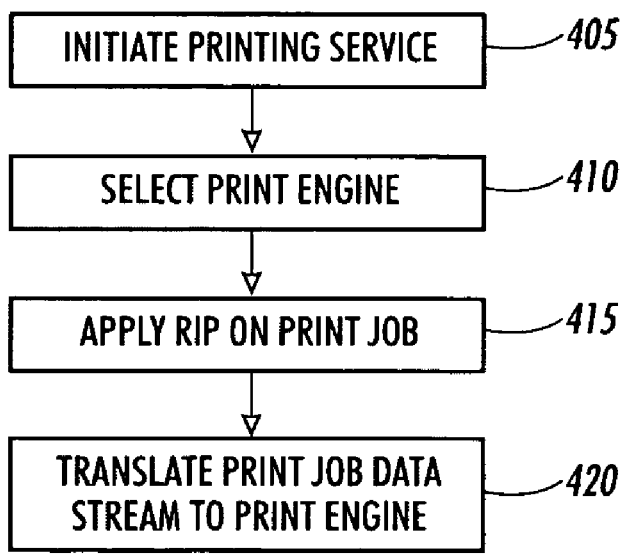
FIG. 4 illustrates another flow diagram implemented by the remote printing service in accordance with yet another embodiment.

FIG. 4 illustrates a flow diagram 400 implemented by the controller 210 in accordance with yet another embodiment. It should be readily apparent to those of ordinary skill in the art that the flow diagram 400 depicted in FIG. 4 represents a generalized illustration and that other steps may be added or existing steps may be removed or modified.

As shown in FIG. 4, the controller 210 may be configured an indication that a user has initiate a printing command, in step 405. The controller 210 may be also be configured to receive an indication from the user 110 that the print command was directed to a selected print engine 130, in step 410.

In step 415, the controller 210 may be configured to take the vector image data from the software application and forward that data to the raster image processor 240. The raster image processor 240 may convert the vector-image data into bit-image data. During the conversion process, the raster image processor 240 retrieves the image correction data for the selected print engine 130. As the RIP processing completes, the raster image processor 240 may be configured to prepare a print-ready format file.

In step 420, the controller 210 may be configured to transmit the print-ready format file to the print engine through the network I/F 220.

Figure 5:
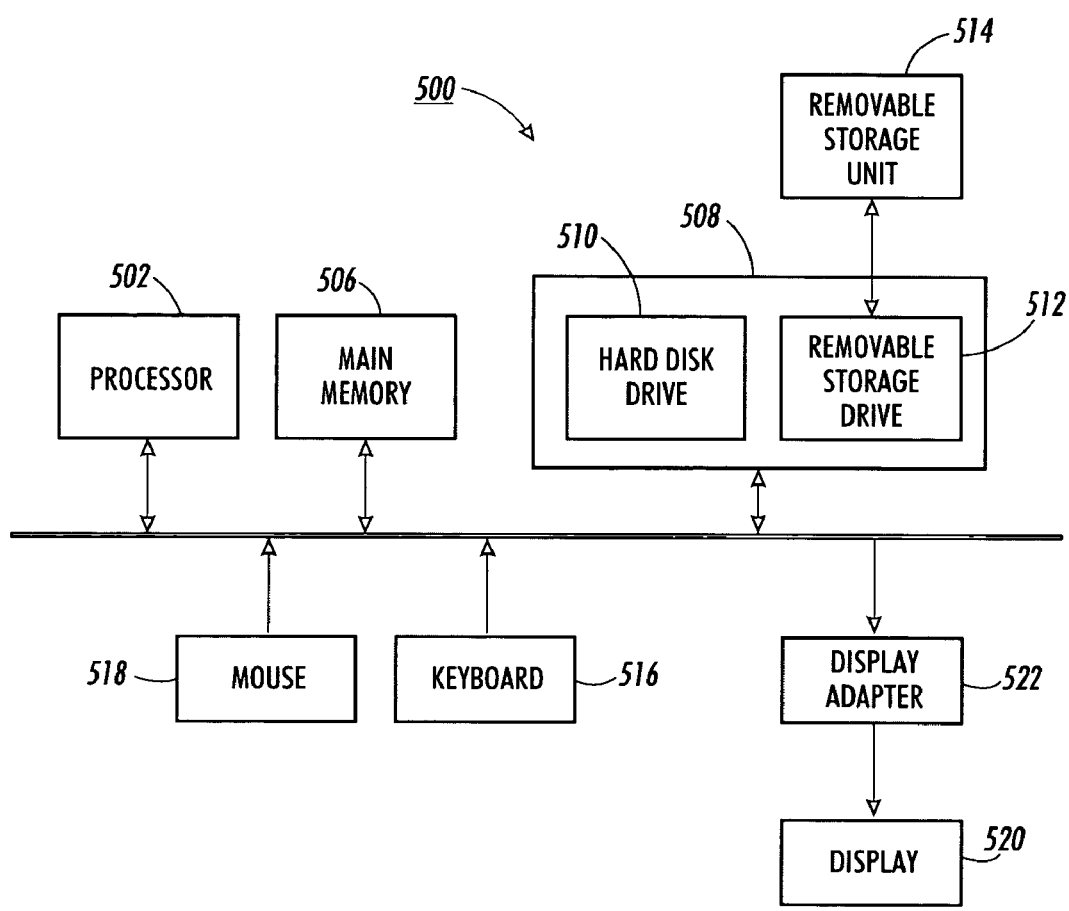
FIG. 5 illustrates an exemplary block diagram of a computing platform where an embodiment may be practiced.

FIG. 5 illustrates an exemplary block diagram of a computing platform 500 where an embodiment may be practiced. The functions of the visual enhancement module may be implemented in program code and executed by the computing platform 500. The visual enhancement module may be implemented in computer languages such as PASCAL, C, C++, JAVA, etc.

As shown in FIG. 5, the computer system 500 includes one or more processors, such as processor 502 that provide an execution platform for embodiments of the RPS. Commands and data from the processor 502 are communicated over a communication bus 504. The computer system 500 also includes a main memory 506, such as a Random Access Memory (RAM), where the software for the RPS may be executed during runtime, and a secondary memory 508. The secondary memory 508 includes, for example, a hard disk drive 520 and/or a removable storage drive 522, representing a floppy diskette drive, a magnetic tape drive, a compact disk drive, etc., where a copy of a computer program embodiment for the RPS may be stored. The removable storage drive 522 reads from and/or writes to a removable storage unit 524 in a well-known manner. A user interfaces with the RPS with a keyboard 526, a mouse 528, and a display 520. The display adaptor 522 interfaces with the communication bus 504 and the display 520 and receives display data from the processor 502 and converts the display data into display commands for the display 520.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method for providing printing services, the method comprising:
   providing a database configured to store data related to a plurality of print engines, wherein the data includes static and time-varying characteristics for each of the print engines of the plurality of print engines, wherein the static characteristics comprise a toner colorant, a halftone screen selection, and a printer resolution, and wherein the time-varying characteristics comprise a toner reproduction curve and a gray balance;
   selecting a first print engine from the plurality of print engines;
   initiating a print job for the first print engine;
   calibrating, by a remote printing service, the first print engine to collect updated data related to the first print engine;

processing, at the remote printing service, the print job by applying, to data associated with the print job, image correction data based on the updated data related to the first print engine to create a first print engine print file; and providing the first print engine print file to the first print engine.

2. The method according to claim 1, further comprising: calibrating the plurality of print engines
to collect updated data related to the plurality of print engines.

3. The method according to claim 2, further comprising transmitting the updated data to the database.

4. A system for providing printing services, the system comprising:
- a plurality of print engines;
- a remote printing service; and
- a network configured to connect the plurality of print engines and the remote printing service, wherein the remote printing service further comprises:
  - a plurality of document applications;
  - a print engine database configured to store data associated with static and time-varying characteristics of each of the print engines of the plurality of print engines, wherein the static characteristics comprise a toner colorant, a halftone screen selection, and a printer resolution, and wherein the time-varying characteristics comprise a toner reproduction curve and a gray balance; and
  - a digital front end configured to calibrate a selected print engine from the plurality of print engines to collect updated data associated with the selected print engine. wherein a print job issued for the selected print engine from a selected document application is processed, by the digital front end, by applying, to data associated with the print job, image correction data based on the updated data associated with the selected print engine to generate a print file.

5. The system according to claim 4, wherein the remote printing service comprises a controller configured to transmit the print file over the network.

6. The system according to claim 4, wherein the plurality of document applications is at least one of a word processing application, a spreadsheet application, a presentation software, and database application.

7. The system according to claim 4, wherein each of the plurality of print engines comprises a network interface and electronics to cause the print file to be printed.

8. A computer readable storage medium on which is embedded one or more computer programs, said one or more computer programs implementing a method of providing printing services, said one or more computer programs comprising a set of instructions for:
providing a database configured to store data related to a plurality of print engines, wherein the data includes static and time-varying characteristics for each of the print engines of the plurality of print engines, wherein the static characteristics comprise a toner colorant, a halftone screen selection, and a printer resolution, and wherein the time-varying characteristics comprise a toner reproduction curve and a gray balance;
selecting a first print engine from the plurality of print engines;
initiating a print job for the first print engine;
calibrating, by a remote printing service, the first print engine to collect updated data related to the first print engine;
processing, at the remote printing service, the print job by applying, to data associated with the print job, image correction data based on the updated data related to the first print engine to create a first print engine print file; and
providing the first print engine print file to the first print engine.

9. The computer readable storage medium according to claim 8, said set of instructions further comprises:
calibrating the plurality of print engines
to collect updated data related to the plurality of print engines.

10. The computer readable storage medium according to claim 9, said set of instructions further comprises transmitting the updated data to the database.

* * * * *